April 26, 1955 M. R. SOBER 2,707,019
WHEEL CHAIR
Filed Aug. 25, 1952 2 Sheets-Sheet 1
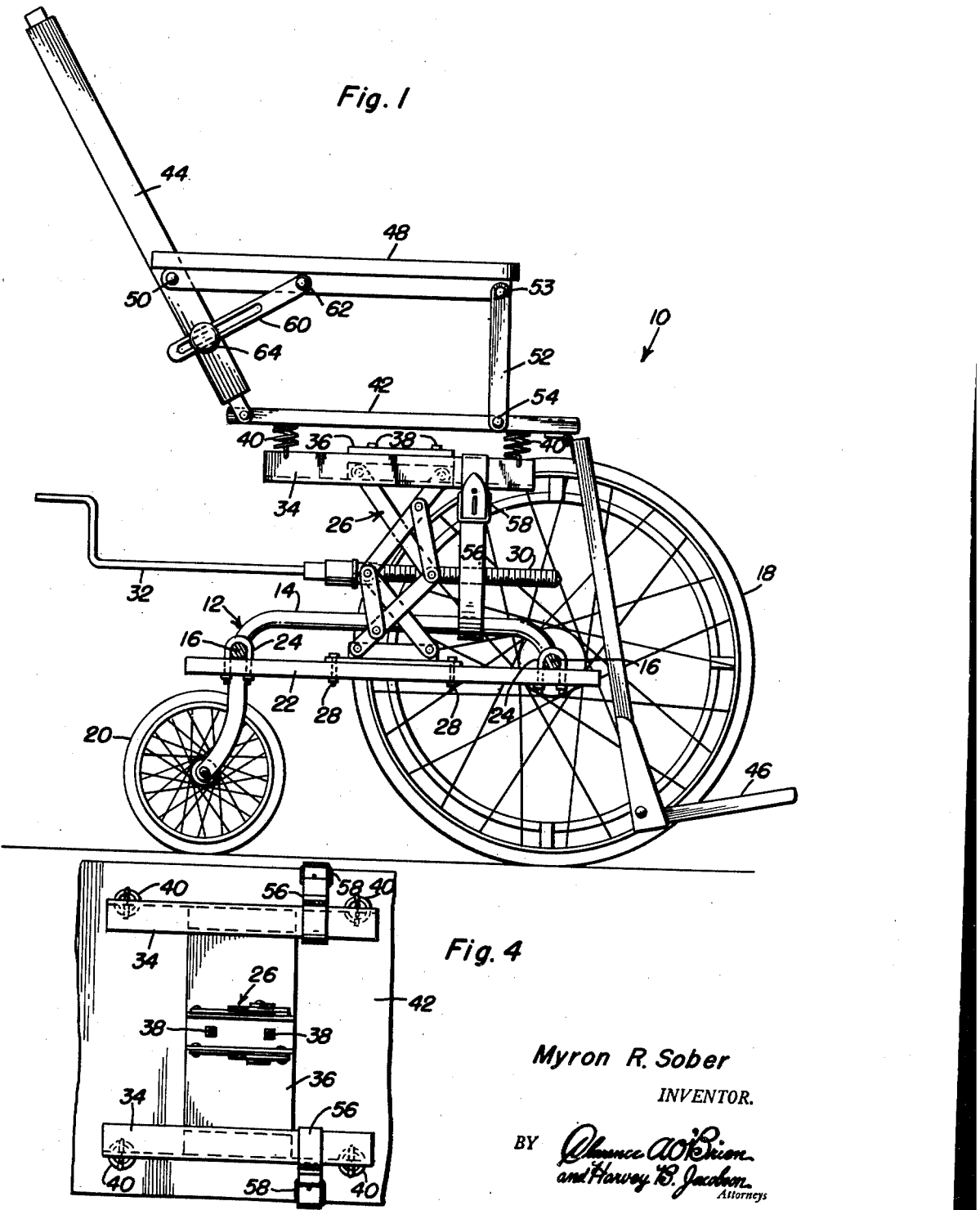
Myron R. Sober
INVENTOR.

April 26, 1955
M. R. SOBER
2,707,019
WHEEL CHAIR
Filed Aug. 25, 1952
2 Sheets-Sheet 2
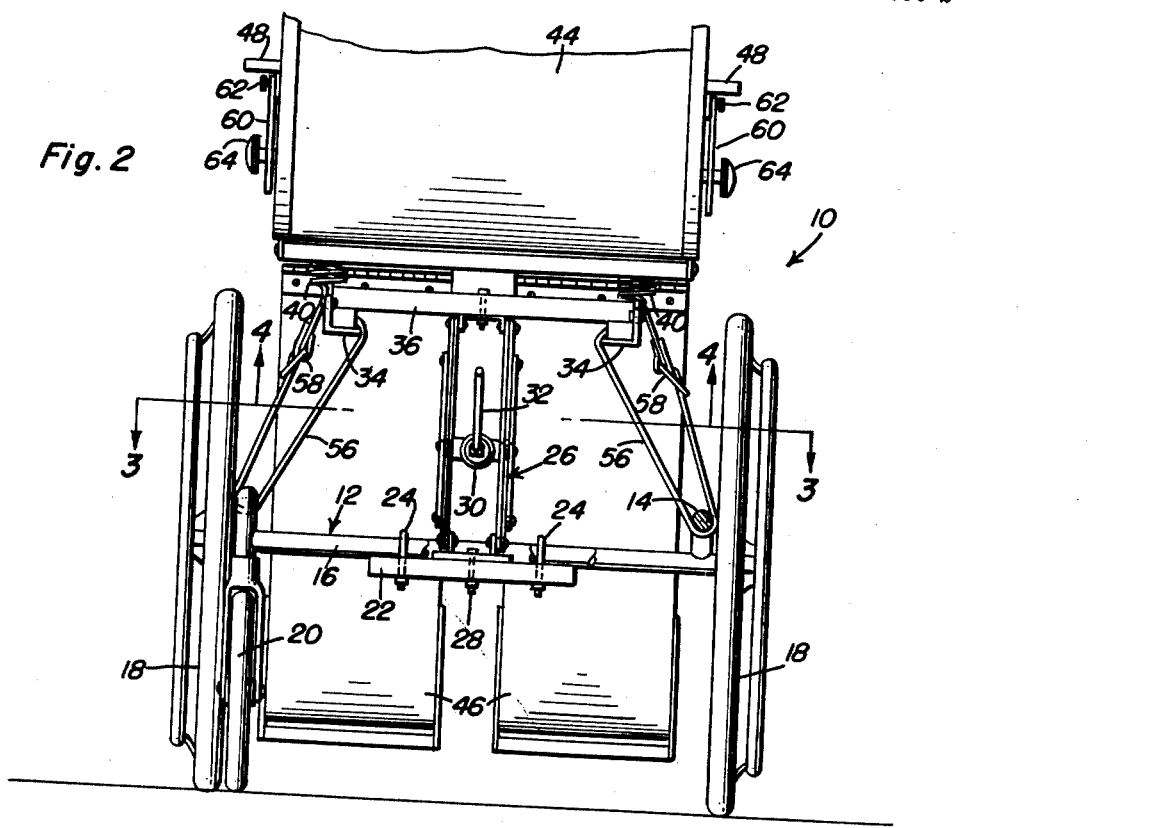
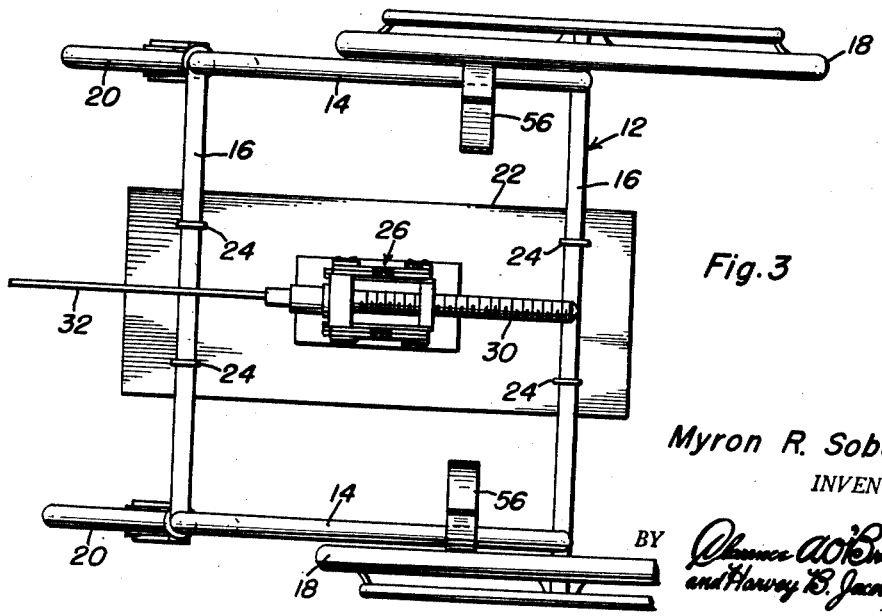
Myron R. Sober
INVENTOR.

United States Patent Office 2,707,019
Patented Apr. 26, 1955

2,707,019

WHEEL CHAIR

Myron R. Sober, Eyers Grove, Pa.

Application August 25, 1952, Serial No. 306,237

1 Claim. (Cl. 155—30)

This invention relates to new and useful improvements and structural refinements in wheel chairs, and the principal object of the invention is to provide a wheel chair which may be quickly and easily adjusted as to height, primarily for the purpose of facilitating efficient and comfortable transferring of a patient from a bed to the wheel chair and vice versa.

The above object is achieved by the provision of a wheel chair including a chassis, a seat, and vertically adjustable jack means between the chassis and the seat, whereby the latter may be raised or lowered.

Some of the advantages of the invention reside in its simplicity of construction, in its efficient operation and in its adaptability to economical manufacture.

With the above more important objects and features in view, and such other objects and features as may become apparent as this specification proceeds, the invention consists essentially of the arrangement and construction of parts as illustrated in the accompanying drawings, in which:

Figure 1 is a side elevational view of the invention.

Figure 2 is a fragmentary front elevational view thereof.

Figure 3 is a horizontal sectional view, taken substantially in the plane of the line 3—3 in Figure 2, and Figure 4 is a sectional view, taken substantially in the plane of the line 4—4 in Figure 2.

Like characters of reference are employed to designate like parts in the specification and throughout the several views.

Referring now to the accompanying drawings in detail, the invention comprises a wheel chair designated generally by the reference character 10, the same embodying in its construction a chassis 12 including a pair of slide rails 14, and a pair of cross members 16, the chassis being provided with the usual wheels 18 and casters 20 as will be clearly understood.

An elongated platform 22 is secured to the chassis 12, specifically to the cross members 16 of the chassis by suitable U-clamps 24, and a vertically adjustable jack unit 26 of a conventional type is secured to the platform 22 by suitable bolts 28. This jack unit is actuated by means of a screw-shaft 30 which may be rotated by means of a removable extension handle 32 when the jack unit is to be raised or lowered.

The jack unit 26 carries at the top thereof a seat support including a pair of angle-shaped side members 34 and a crosspiece 36, the latter being secured to the jack unit 26 by suitable bolts 38.

Suitable compression springs 40 are anchored to and extend upwardly from the side members 34 and carry a seat 42, the purpose of the springs 40, of course, being to absorb vibration so that it is not imparted from the chassis to the seat.

The seat 42 is provided with a hinged back rest 44 and with an adjustable foot rest 46, and a pair of arm rests 48 are attached to the back rest 44 by pivot pins 50. The front ends of the arm rests 48 are supported by upstanding straps or links 52 which are connected to the arm rests by removable pins 53 and to the seat 42 by pivot pins 54.

Slotted strips 60 are connected to the arm rests by removable pins 62 and adjusting screws 64 extend through the slots thereof into the sides of the back rest 44.

When it is desired to transfer a patient from a bed to the chair, the chair is positioned adjacent the bed in parallel relation and by removing the pins 53 and 62, the arm rests 48 and straps 52 may be dropped downwardly so that a patient may be transferred directly to the wheel chair. This may be further facilitated by lowering the back rest 44 to a substantially coplanar relation with the seat 42 and the adjacent bed.

Needless to say by actuating the jack unit 26 the seat 42 may be raised or lowered so as to conform to the height of the bed and when the wheel chair is in readiness for traveling, suitable stabilizing straps 56 equipped with buckles 58 may be passed around the side rails 14 of the chassis frame and around the side members 34 of the seat support, so as to prevent any lateral swaying movement of the seat.

It is believed that the advantages and use of the invention will be readily understood from the foregoing disclosure and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

In a wheel chair, the combination of a wheeled chassis including a platform and a pair of side rails, a jack unit mounted on said platform, a seat support carried by said jack unit and including a pair of side members, said jack unit forming a vertical adjustment for said seat support, a pair of stabilizing members connecting said side members to the respective side rails, springs provided on said support, and a seat mounted on said springs, each of said stabilizing members comprises a flexible strap passing around a side member and a side rail, and a buckle adjustably connecting the ends of said strap together.

References Cited in the file of this patent

UNITED STATES PATENTS

| | | |
|---|---|---|
| 521,463 | Smith-Fraser | June 19, 1894 |
| 961,389 | Walker | June 14, 1910 |
| 1,696,126 | Salmon | Dec. 18, 1928 |
| 1,739,366 | Lang | Dec. 10, 1929 |
| 2,233,262 | Jacobson | Feb. 25, 1941 |